United States Patent
Zhou et al.

(10) Patent No.: US 9,942,906 B1
(45) Date of Patent: Apr. 10, 2018

(54) SYSTEMS AND METHODS FOR DETERMINING A SUBFRAME CONFIGURATION FOR AN ACCESS NODE BASED ON COVERAGE

(71) Applicant: Sprint Spectrum LP, Overland Park, KS (US)

(72) Inventors: Yu Zhou, Herndon, VA (US); Muhammad Ahsan Naim, Sterling, VA (US); Volkan Sevindik, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 267 days.

(21) Appl. No.: 14/855,673

(22) Filed: Sep. 16, 2015

(51) Int. Cl.
| | |
|---|---|
| *H04L 12/26* | (2006.01) |
| *H04W 72/04* | (2009.01) |
| *H04W 72/08* | (2009.01) |
| *H04L 12/803* | (2013.01) |

(52) U.S. Cl.
CPC ....... *H04W 72/0486* (2013.01); *H04L 47/125* (2013.01); *H04W 72/048* (2013.01); *H04W 72/085* (2013.01)

(58) Field of Classification Search
None
See application file for complete search history.

(56) References Cited

U.S. PATENT DOCUMENTS

| | | | |
|---|---|---|---|
| 8,611,331 B2 | 12/2013 | Ji et al. | |
| 2013/0272170 A1* | 10/2013 | Chatterjee | H04W 28/02 370/280 |
| 2014/0112259 A1* | 4/2014 | Bagheri | H04W 74/006 370/329 |
| 2015/0003301 A1* | 1/2015 | He | H04B 7/0452 370/280 |
| 2015/0124663 A1* | 5/2015 | Chen | H04L 5/0053 370/278 |
| 2015/0245246 A1* | 8/2015 | Golitschek | H04L 5/0094 370/280 |

FOREIGN PATENT DOCUMENTS

WO  2014056643 A1  4/2014

\* cited by examiner

*Primary Examiner* — Chi H Pham
*Assistant Examiner* — Fahmida Chowdhury

(57) ABSTRACT

Systems and methods are described for determining a subframe configuration for an access node based on coverage. An access node may communicate with wireless devices using a subframe configuration, however there may be a plurality of subframe configuration options. A utility function may be calculated for each of the plurality of subframe configurations based on, for example, a coverage for each subframe configuration and a number of wireless devices serviced by each subframe configuration. The utility function may provide an indication of a subframe configuration's value to the wireless system based on considerations such as coverage over wireless devices and signal quality for the covered wireless devices. The subframe configuration with the greatest utility function may then be selected to be used for communication between the access node and wireless devices.

18 Claims, 8 Drawing Sheets

SYSTEMS AND METHODS FOR DETERMINING A SUBFRAME CONFIGURATION FOR AN ACCESS NODE BASED ON COVERAGE

TECHNICAL BACKGROUND

Telecommunication systems, such as cellular networks or other wireless networks, use various network links throughout the network to communicate. While providing wireless services, portions of the network may experience variances in conditions. For example, an access node may provide wireless service to a large number of wireless devices at one point in time, and may then experience a drop in load at some time in the future. Additionally, the wireless device may comprise varying application requirements that place varying load conditions on the wireless resources used for communication. Accordingly, a system that effectively balances load based on network conditions may be able to provide a high quality service to users of the system.

Overview

Systems and methods are described for determining a subframe configuration for an access node based on coverage. Data may be communicated between an access node and a plurality of wireless devices using a first subframe configuration from among a plurality of subframe configurations available at the access node. A utility function may be calculated for each of the plurality of subframe configurations, wherein the utility function is based on a coverage for each subframe configuration and a number of wireless devices serviced by each subframe configuration. A subframe configuration from the plurality of subframe configurations with the greatest calculated utility function may then be selected. The first subframe configuration may be adjusted to the selected subframe configuration such that the access node and the plurality of wireless devices communicate using the selected subframe configuration.

DETAILED DESCRIPTION

Systems and methods are described for determining a subframe configuration for an access node based on coverage. An access node may communicate with wireless devices using a subframe configuration, however there may be a plurality of subframe configuration options. A utility function may be calculated for each of the plurality of subframe configurations based on, for example, a coverage for each subframe configuration and a number of wireless devices serviced by each subframe configuration. The utility function may provide an indication of a subframe configuration's value to the wireless system based on considerations such as coverage over wireless devices and signal quality for the covered wireless devices. The subframe configuration with the greatest utility function may then be selected to be used for communication between the access node and wireless devices.

Figure 1:
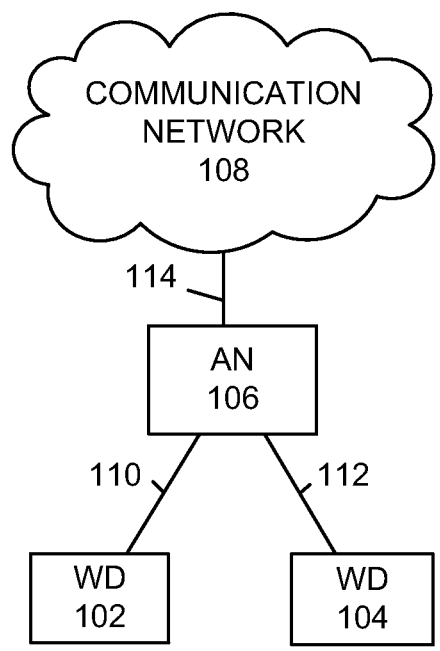
FIG. 1 illustrates an exemplary communication system to determine a subframe configuration for an access node based on coverage.
Figure 1:
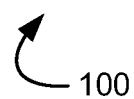

FIG. 1 illustrates an exemplary communication system 100 to determine a subframe configuration for an access node based on coverage comprising wireless devices 102 and 104, access node 106, communication network 108, and communication links 110, 112, and 114. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 106 and communication network 108 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, or an internet access device, and combinations thereof. It is noted that while two wireless devices are illustrated in FIG. 1 as being in communication with access node 106, any number of wireless devices can be implemented.

Access node 106 is a network node capable of providing wireless communications to wireless devices 102 and 104, and can be, for example, a base transceiver station, a radio base station, and an eNodeB device. Access node 106 may communicate with communication network 108 over communication link 114. Although only access node 106 is illustrated in FIG. 1, wireless devices 102 and 104 (and other wireless device not depicted) can be in communication with a plurality of access nodes and/or small cells. The plurality of access nodes and/or small cells can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, and 114, can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
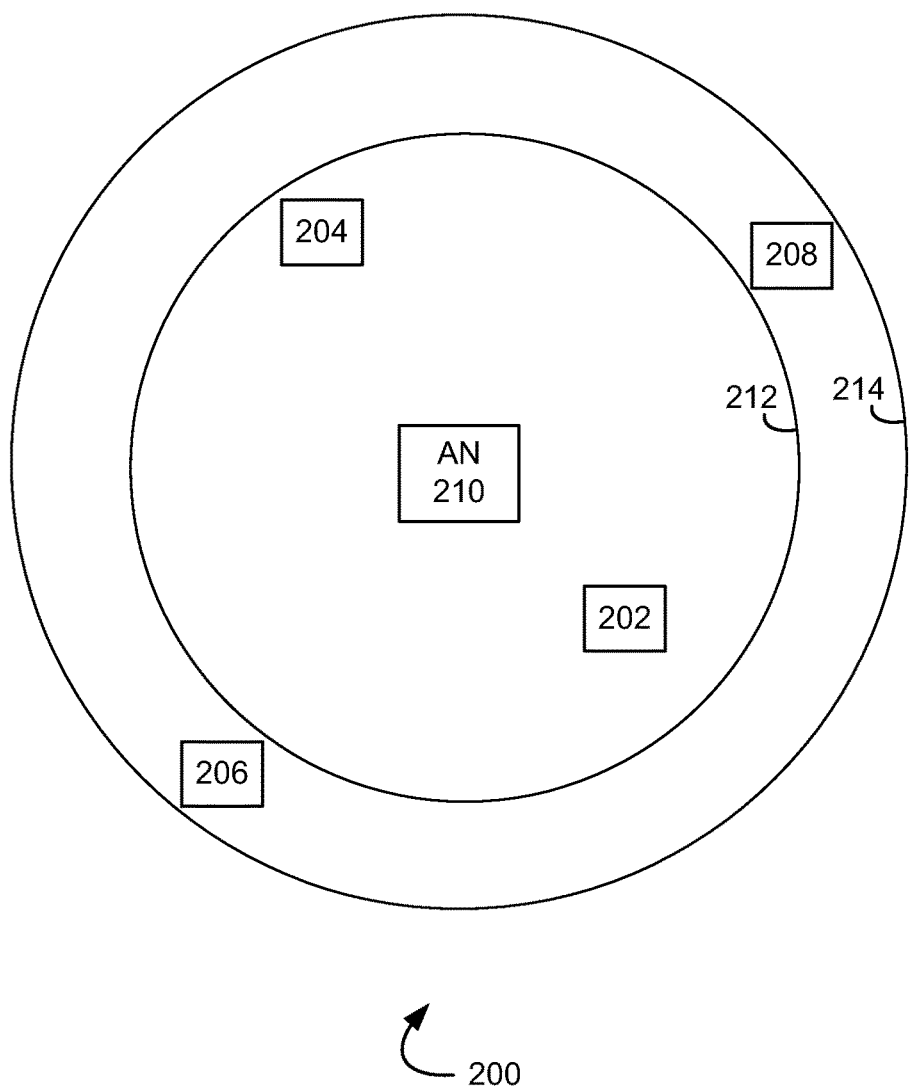
FIG. 2 illustrates another exemplary system to determine a subframe configuration for an access node based on coverage.

FIG. 2 illustrates an exemplary communication system 200 for determining a subframe configuration for an access node based on coverage. System 200 comprises wireless devices 202, 204, 206, and 208, access node 210, coverage areas 212 and 214. Wireless devices 202, 204, 206, and 208 may comprise a device similar to wireless device 102. Access node 210 may comprise an access node similar to access node 106.

In operation, access node 210 may establish communication with wireless device 202 such that access node 210 provides the wireless device access to a communication network (e.g., communication network 108). In an embodiment, access node 210 may implement one of a plurality of subframe structures to communicate with wireless devices 202, 204, 206, and 208. A subframe structure may comprise a mix of uplink and downlink subframes within a frame structure, where access node 210 and wireless devices 202, 204, 206, and 208 schedule wireless transmissions to one another based on the subframe structure.

Coverage areas 212 and 214 may comprise areas around access node 210 where a wireless device within the area may establish and/or maintain a connection with the access node (e.g., an RRC connection) and communicate with the access node. In an embodiment, coverage area 212 may correspond to a first subframe structure used by access node 210 to communicate with wireless devices and coverage area 214 may correspond to a second subframe structure used to communicate with the access node. In an example, wireless devices that fall within one of coverage areas 212 and 214 may be provided wireless resources by access node 210 when the access node implements the corresponding subframe structure for the coverage area.

In an embodiment, system 200 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, access node 210 may communicate using one of a plurality of subframe structures, where the subframe structures differ based on the mix of uplink subframes and downlink subframes that make up a frame for each subframe structure. For example, access node 210 may implement an enhanced interference management and traffic adaptations (eIMTA) protocol to dynamically adapt subframe structures. When access node 210 implements a subframe structure, the coverage area for the access node may also change based on the particular mix of uplink and downlink subframes for the subframe structure. For example, coverage area 212 may correspond to a first subframe structure used by access node 210 to communicate with wireless devices and coverage area 214 may correspond to a second subframe structure used to communicate with the access node. Accordingly, a system that determines a frame structure for access node 210 based on coverage may be able to provide enhanced wireless services to users of the system.

Figure 3:
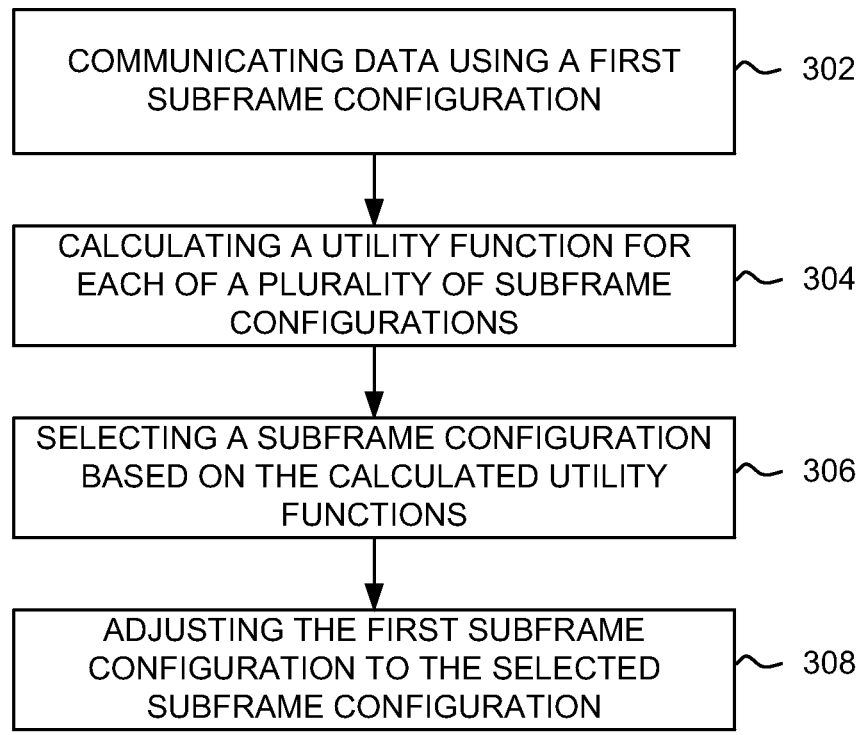
FIG. 3 illustrates an exemplary method of determining a subframe configuration for an access node based on coverage.

FIG. 3 illustrates an exemplary method for determining a subframe configuration for an access node based on coverage. The method will be discussed with reference to the exemplary communication system 200 illustrated in FIG. 2, however, the method can be implemented with any suitable communication system.

Referring to FIG. 3, at step 302, data may be communicated between an access node and a plurality of wireless devices using a first subframe configuration from among a plurality of subframe configurations available at the access node. For example, access node 210 may communicate with wireless devices 202, 204, 206, and 208 using a first subframe configuration from among a plurality of subframe configurations available for implementation at access node 210.

At step 304, a utility function may be calculated for each of the plurality of subframe configurations, wherein the utility function is based on a coverage for each subframe configuration and a number of wireless devices serviced by each subframe configuration. For example, coverage area 212 may correspond to a first subframe configuration and coverage area 214 may correspond to a second subframe configuration. In an embodiment, access node 210 may communicate with wireless devices over each coverage area when implementing the corresponding subframe configuration.

Based on the communication between access node 210 and wireless devices 202, 204, 206, and 208 using the first subframe configuration, a number of wireless devices serviced by implementation of each subframe configuration at access node 210 may be determined (e.g., predicted or estimated). The number of wireless devices serviced may be determined by a (predicted or estimated) coverage for each subframe configuration. A utility function for each subframe configuration may be determined based on the coverage information.

At step 306, a subframe configuration from the plurality of subframe configurations with the greatest calculated utility function may be selected. For example, based on the calculated utility function for each subframe configuration, the subframe configuration with the greatest utility function may be selected.

At step 308, the first subframe configuration may be adjusted to the selected subframe configuration such that the access node and the plurality of wireless devices communicate using the selected subframe configuration. For example, access node 210 may switch from using the first subframe configuration for communication with wireless devices to using the selected subframe configuration for communication with wireless devices.

Figure 4:
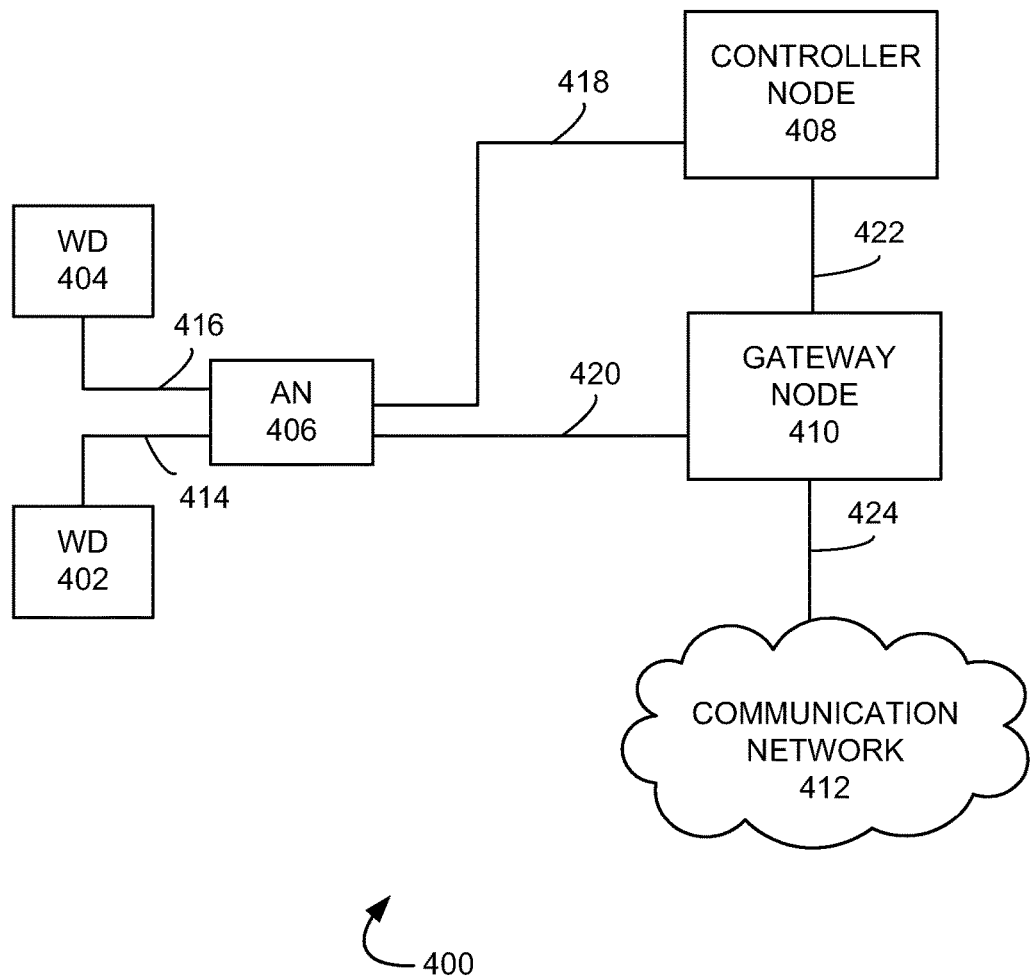
FIG. 4 illustrates another exemplary system to determine a subframe configuration for an access node based on coverage.

FIG. 4 illustrates another exemplary communication system 400 to determine a subframe configuration for an access node based on coverage. Communication system 400 may comprise wireless devices 402 and 404, access nodes 406, controller node 408, gateway node 410, communication network 412, and communication links 414, 416, 418, 420, 422, and 424. Other network elements may be present in the communication system 400 to facilitate communication but are omitted for clarity, such as base stations, base station controllers, gateways, mobile switching centers, dispatch application processors, and location registers such as a home location register or visitor location register.

Wireless devices 402 and 404 can be any device configured to communicate over communication system 400 using a wireless communication link. For example, wireless devices 402 and 404 can include a cell phone, a smart phone, a computing platform such as a laptop, palmtop, or a tablet, a personal digital assistant, or an internet access device, and combinations thereof.

Access node 406 is a network node capable of providing wireless communications to wireless devices 402 and 404, and can be, for example, a base transceiver station, a radio base station, or an eNodeB device. In an embodiment, access node 406 can comprise a serving access node for wireless devices 402 and 404. Access node 406 may communicate with controller node 408 over communication link 418, and with gateway node 410 over communication link 420.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), a mobile switching center (MSC), and a combination thereof.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access node 406 related to channel selection in communications with wireless devices 402 and 404. For example, gateway node 410 can comprise at least one of a serving gateway (SGW), a packet data network gateway (PDNGW), a cellular gateway (CGW), and a combination thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, and 424 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 406, controller node 408, gateway node 410, and communication network 412 which are omitted for clarity, including additional processing nodes, routers, gateways, and physical and/or wireless data links for carrying data among the various network elements. In an embodiment, any of controller node 408, gateway node 410, and one or more modules of access node 406 may perform all or parts of the methods of FIGS. 3 and 6.

Figure 5:
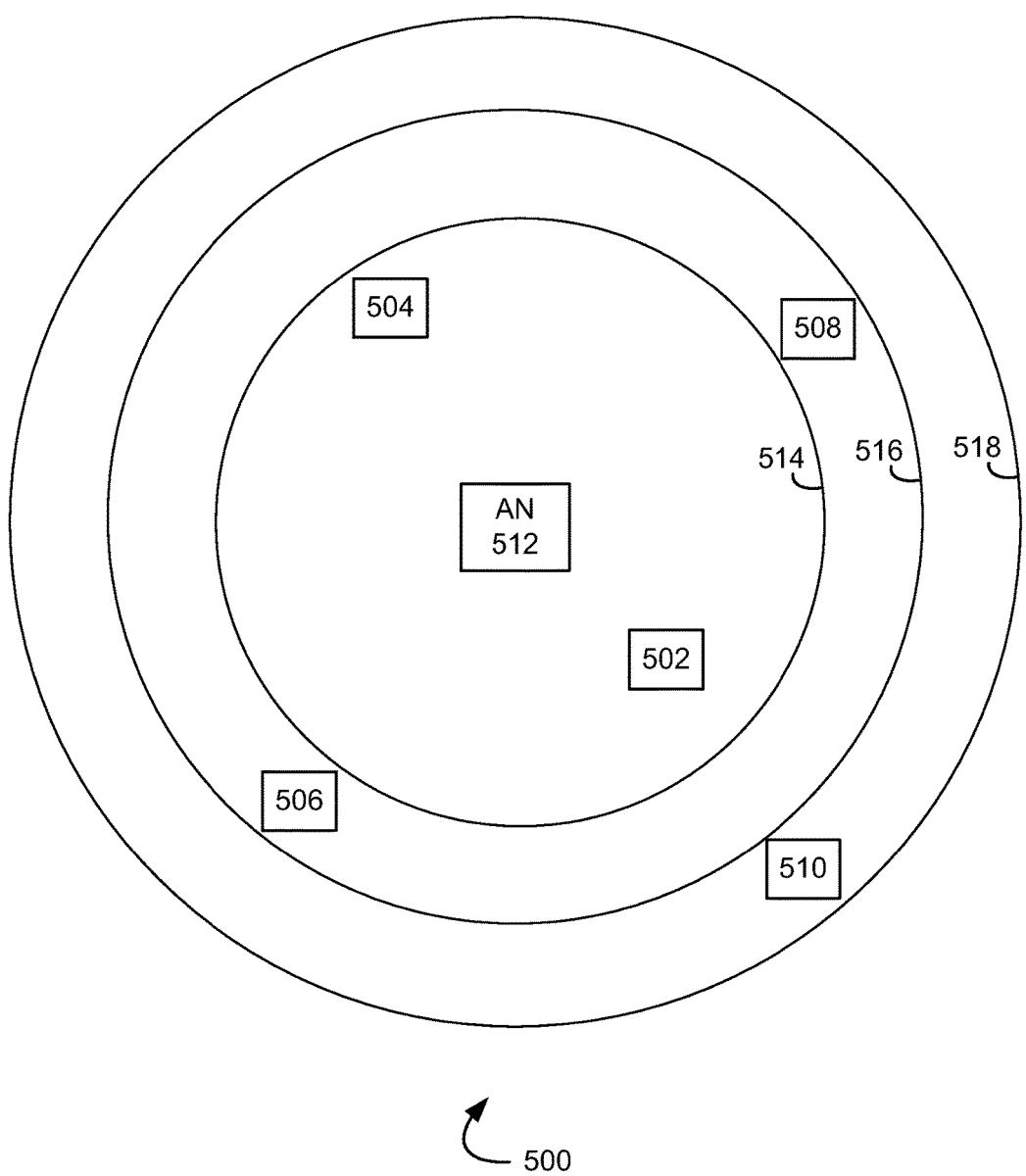
FIG. 5 illustrates another exemplary system to determine a subframe configuration for an access node based on coverage.

FIG. 5 illustrates an exemplary communication system 500 for determining a subframe configuration for an access node based on coverage. System 500 comprises wireless devices 502, 504, 506, 508, and 510, access node 512, coverage areas 514, 516, and 518. Wireless devices 502, 504, 506, 508, and 510 may comprise a device similar to wireless device 402. Access node 512 may comprise an access node similar to access node 406.

In operation, access node 512 may establish communication with wireless device 502 such that access node 512 provides the wireless device access to a communication network (e.g., communication network 412). In an embodiment, access node 512 may implement one of a plurality of subframe structures to communicate with wireless devices 502, 504, 506, 508, and 510. A subframe structure may comprise a mix of uplink and downlink subframes within a frame structure, where access node 512 and wireless devices 502, 504, 506, 508, and 510 schedule wireless transmissions to one another based on the subframe structure.

Coverage areas 514, 516, and 518 may comprise areas around access node 512 where a wireless device within the area may establish and/or maintain a connection with the access node (e.g., an RRC connection) and communicate with the access node. In an embodiment, coverage area 514 may correspond to a first subframe structure used by access node 512 to communicate with wireless devices, coverage area 516 may correspond to a second subframe structure used to communicate with the access node, and coverage area 518 may correspond to a third subframe structure used to communicate with the access node. In an example, wireless devices that fall within one of coverage areas 514, 516, and 518 may be provided wireless resources by access node 512 when the access node implements the corresponding subframe structure for the coverage area.

In an embodiment, system 500 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, access node 512 may communicate using one of a plurality of subframe structures, where the subframe structures differ based on the mix of uplink subframes and downlink subframes that make up a frame for each subframe structure. For example, access node 512 may implement an enhanced interference management and traffic adaptations (eIMTA) protocol to dynamically adapt subframe structures. When access node 512 implements the subframe structures, the coverage area for the access node may also change based on the particular subframe structure. For example, coverage area 514 may correspond to a first subframe structure used by access node 512 to communicate with wireless devices and coverage area 516 may correspond to a second subframe structure used to communicate with the access node. Accordingly, a system that determines a frame structure for access node 512 based on coverage may be able to provide enhanced wireless services to users of the system.

Figure 6:
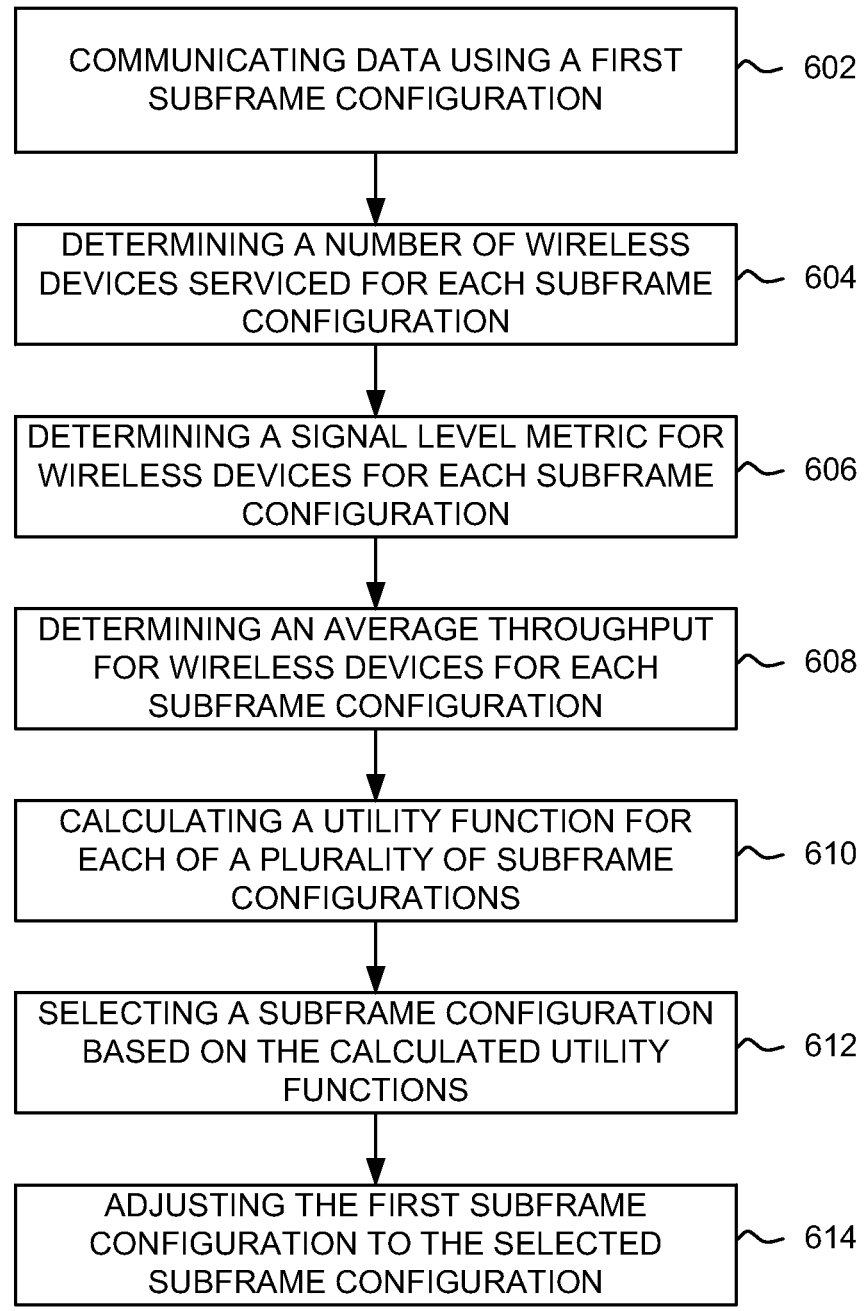
FIG. 6 illustrates another exemplary method of determining a subframe configuration for an access node based on coverage.

FIG. 6 illustrates an exemplary method for determining a subframe configuration for an access node based on coverage. The method will be discussed with reference to the exemplary communication system 500 illustrated in FIG. 5, however, the method can be implemented with any suitable communication system.

Referring to FIG. 6, at step 602, data may be communicated between an access node and a plurality of wireless devices using a first subframe configuration from among a plurality of subframe configurations available at the access node. For example, access node 512 may communicate with wireless devices 502, 504, 506, 508, and 510 using a first subframe configuration from among a plurality of subframe configurations available for implementation at access node 512.

In an embodiment, access node 512 may communicate with wireless devices 502, 504, 506, 508, and 510 using a time division duplex (TDD) system. For example, in TDD system, a subframe structure may comprise a number of subframes (e.g. Transmission Time Intervals, TTIs) that include a mix of uplink subframes and downlink subframes. In some embodiments, a special subframe may also be used, for instance, as a guard between an uplink subframe and a downlink subframe or for any other suitable purpose. When using a TDD structure, an uplink subframe and a downlink subframe may be transmitted over the same frequency but at different times. In an embodiment, a subframe configuration may comprise a subframe structure.

Figure 7:
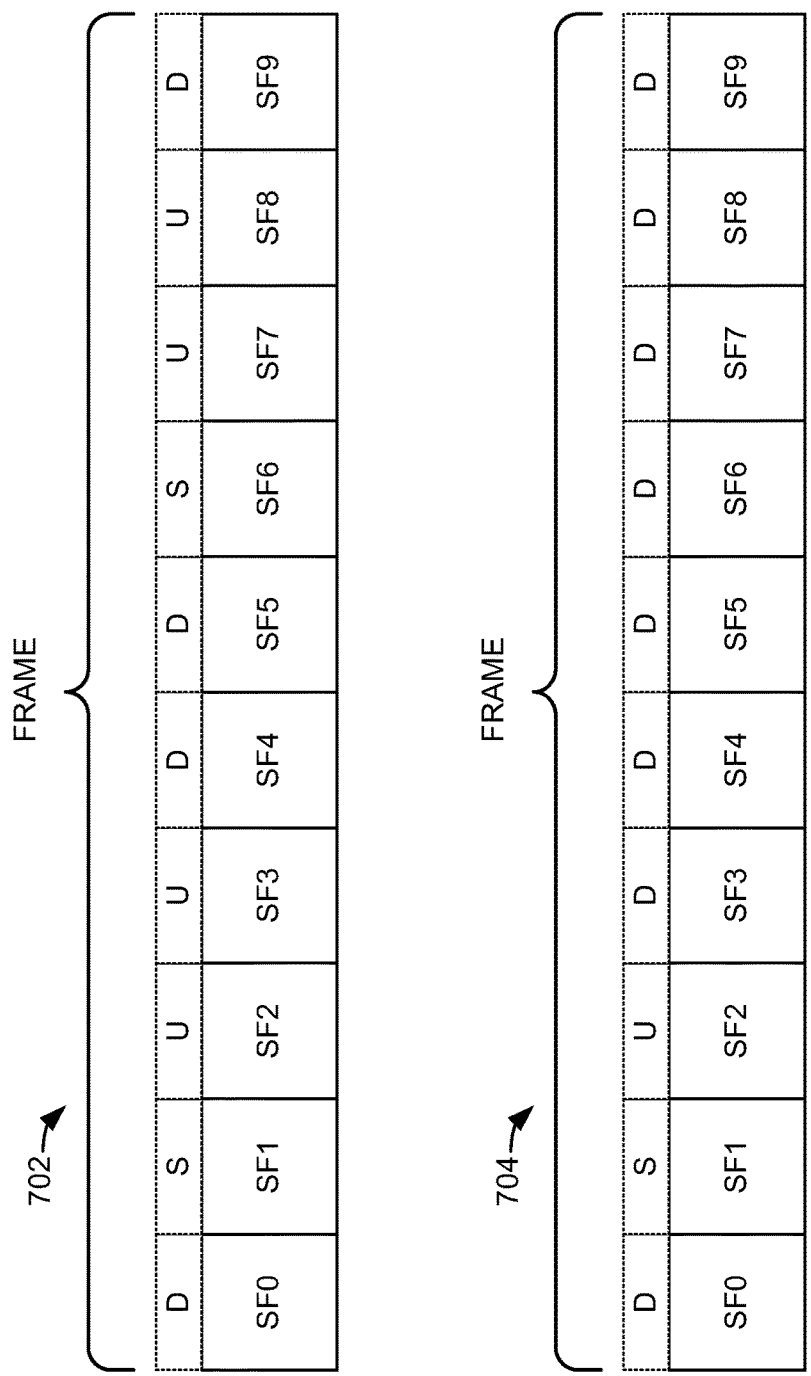
FIG. 7 illustrates an exemplary frame structure.

Access node 512 may use one or more subframe structures to communicate with wireless devices 502, 504, 506, 508, and 510. In an embodiment, a subframe structure may comprise uplink subframes, downlink subframes, and special subframes, where each frame structure may comprise a different mix of subframes. FIG. 7 illustrates exemplary subframe structures in accordance with embodiments. An example subframe structure may comprise 10 subframes, where the order of subframes may comprise downlink, special, uplink, uplink, downlink, downlink, special, uplink, uplink, and downlink. Subframe structure 702 illustrates this example. Subframe structure 704 illustrates another example subframe structure that comprises a greater number of uplink subframes than subframe structure 702. In an embodiment, the coverage for access node 512 may expand when the subframe structure used to communicate with the wireless devices changes from subframe structure 702 to subframe structure 704 based on the larger number of uplink subframes.

In an embodiment coverage areas 514, 516, and 518 may correspond to a coverage area for access node 512 when communicating with wireless devices using a first subframe configuration, a second subframe configuration, and a third subframe configuration, respectively. Accordingly, the coverage for access node 512 (i.e., coverage area over which access node 512 provides wireless services) may be based on the subframe configuration implemented.

In an embodiment, coverage areas may be predicted or estimated. For example, access node 512 may implement a first subframe structure, and thus may comprise coverage area 514. Coverage areas 516 and 518 may be predicted or estimated based on coverage area 514 and the differences between the first subframe configuration and the second and third subframe configurations. For example, the second subframe configuration and the third subframe configuration may comprise a greater number of uplink subframes that the first subframe configuration. Accordingly, coverage areas 516 and 518 may be larger than coverage area 514. Any other suitable manner to predict coverage areas may also be implemented.

At step 604, a number of wireless devices serviced for each subframe configuration may be determined. For example, access node 512 may implement a first subframe structure, and thus may comprise coverage area 514. It may be determined that wireless devices 502 and 504 may be serviced by access node 512 when implementing the first subframe structure based on coverage area 514. This may be determined based on network conditions (e.g., number of RRC connections) at the access node.

A number of wireless devices serviced by access node 512 when implementing the second subframe structure and the third subframe structure may similarly be determined. For example, based on the coverage area 514 and the first subframe structure, coverages for access node 512 when implementing the second subframe structure and the third subframe structure (e.g., corresponding to coverage areas 514 and 516) may be predicted or estimated. Accordingly, the number of wireless devices that would be serviced when access node 512 implements the second subframe structure (e.g., wireless devices 502, 504, 506, and 508) may be predicted or estimated and the number of wireless devices that would be serviced when access node 512 implements the third subframe structure (e.g., wireless devices 502, 504, 506, 508, and 510) may be predicted or estimated. In an embodiment, the predictions or estimations may be based on the differences, such as the different mixes of uplink and downlink subframes, between the first, second, and third subframe structures.

At step 606, signal level metric for each wireless device relative to the access node may be determined for each subframe configuration. For example, access node 512 may implement the first subframe structure, and signal level metrics for wireless devices 502 and 504 may be determined. This may be determined based on a modulation and coding scheme (MCS) used to communicate with each wireless device, a channel quality indicator (CQI) reported by each wireless device, one or more data bearers established for each wireless device, or based on any other suitable method for determining a signal level metric. The signal level metric may comprise a CQI, RSRP, or any other suitable signal level metric.

Signal level metrics for wireless devices serviced by access node 512 when implementing the second subframe structure and the third subframe structure may similarly be determined. For example, based on signal level metrics for the wireless devices and the first subframe structure, signal level metrics for wireless devices relative to access node 512 when the access node is implementing the second subframe structure and the third subframe structure may be predicted or estimated. One or more of the MCS, CQIs, RSRPs, data bearers, or combination of these for wireless devices in communication with access node 512 when the access node implements the first subframe structure may be used for the predictions or estimates. In an embodiment, the predictions or estimated may be based on the differences, such as the different mixes of uplink and downlink subframes, between the first, second, and third subframe structures.

In an embodiment, signal level metrics for wireless devices not in communication with access node 512 (e.g., that do not have an RRC connection with access node 512) when implementing the first subframe structure may also be predicted or estimated. For example, wireless device 510 may not comprise an RRC connection with access node 512 when the access node implements the first subframe structure. In an embodiment, channel information for wireless device 510 may be used to predict or estimated the signal level metric for the wireless device according to each subframe structure. The channel information may comprise a signal level (e.g., SINR, RSRP, or any other signal level) received from access node 512. In an embodiment, the channel information may be received at access node 512 from wireless device 510 or a neighboring access node (not depicted), for example a neighboring access node that comprises a serving access node to wireless device 510.

In an embodiment, a location for wireless device 510 may be used to predict or estimate the signal level metric for each subframe configuration. The wireless device may communicate with a GPS system, and the GPS system may be used to determine a location. In another embodiment, signal triangulation may be used to determine a location. For example, a wireless device may receive signals from a plurality of access nodes (e.g. reference signals) at different signal levels. Based on the received signal levels, a distance from each access node may be determined. Accordingly, using the determined distances from each access node, a location may be determined for the wireless device. A location may also be determined in any other suitable manner. Based on the location for the wireless device, a signal level metric may be predicted or estimated for each subframe structure.

At step 608, a historical average data rate (or throughput) for each wireless device may be determined for each subframe configuration. For example, a historical average throughput metric (such as through or data rate over a predetermined window of time) may be determined for each wireless device.

In an embodiment, the historical average throughput metric may be determined for each subframe configuration based on the historical average throughput of each wireless device serviced by the coverage of access node 512 when implementing the particular subframe. For example, when implementing the first subframe structure, access node 512 may service wireless devices 502 and 504 (e.g., based on coverage area 514). Accordingly, the historical average throughput metric may comprise an average or summation of the historical average throughputs for wireless devices 502 and 504. Similarly, the historical average throughput metric for the second subframe structure may be based on the historical average throughputs for wireless devices 502, 504, 506, and 508 (e.g., based on coverage area 516), and the historical average throughput metric for the third subframe structure may be based on the historical average throughputs for wireless devices 502, 504, 506, 508, and 510 (e.g., based on coverage area 518).

At step 610, a utility function may be calculated for each of the plurality of subframe configurations, wherein the utility function is based on a coverage for each subframe configuration and a number of wireless devices serviced by each subframe configuration. For example, coverage area 514 may correspond to a first subframe configuration, coverage area 516 may correspond to a second subframe configuration, and coverage area 518 may correspond to a third subframe configuration. In an embodiment, access node 512 may communicate with wireless devices over each coverage area when implementing the corresponding subframe configuration.

In an embodiment, the utility function for each subframe configuration may be based on a number of wireless devices serviced by each subframe configuration, a historical average throughput metric for the plurality of wireless devices, and a signal level metric for the plurality of wireless devices. For example, the utility function for subframe configuration (or structure) may comprise:

$$U(x) = \frac{SL(s_{i-mork})}{A\_TH(r_{i-mork})} \cdot C(wd_k)$$

Here, SL may comprise a signal level function, A_TH may comprise an average throughput function, C may comprise a coverage function, "i" may comprise a first wireless device, "m" may comprise the number of wireless devices serviced by the subframe configuration from among the plurality of subframe configurations that services the greatest number of wireless devices, and "k" may comprise the number of wireless devices serviced by the particular subframe configuration "x." In an embodiment where the utility function for the second subframe configuration (e.g. corresponding to signal area 516) were being calculated, "k" would comprise 4 (e.g., wireless devices 502, 504, 506, and 508 covered by signal area 516) and "m" would comprise 5 (e.g., wireless devices 502, 504, 506, and 508 covered by signal area 518) based on the third subframe configuration and corresponding signal area 518.

For instance, $SL(s_{i\text{-}m\ or\ k})$ may comprise the average or summation of each signal level metric for wireless devices "i" through "m" or through "k." $A\_TH(r_{i\text{-}m\ or\ k})$ may comprise the average or summation of each historical average throughput for wireless devices "i" through "m" or through "k." In an embodiment, the functions SL and A_TH may be calculated over wireless devices "i" through "m," where "m" is a value less than or equal to the value "k". $C(wd_k)$ may comprise a ratio of covered wireless devices. For example, the ratio of covered wireless devices may comprise the number of wireless devices covered by subframe configuration "x" to the number of wireless devices serviced by the subframe configuration from among the plurality of subframe configurations that services the greatest number of wireless devices.

In an embodiment, $SL(s_{i\text{-}m\ or\ k})$ may provide an indication regarding the downlink data rate that wireless devices would achieve for a particular subframe configuration. For instance, the average or summation of a signal level metric (e.g., SINR or the like) for wireless devices may indicate the modulation and coding scheme the wireless devices would be able to use for communication, and thus the downlink data rates these wireless devices would be able to achieve. The metric $SL(s_{i\text{-}m\ or\ k})$ may comprise any other suitable metric that indicates a downlink data rate that wireless devices would achieve for a particular subframe configuration.

In an embodiment, $C(wd_k)$ may indicate a coverage for a particular subframe configuration, where $C(wd_k)$ and $SL(s_{i\text{-}m\ or\ k})$ may be used in the utility function to balance coverage and downlink data rate. For example, some subframe configurations that allow high downlink data rates may comprise smaller coverage areas than other subframe configurations that allow lower downlink data rates but comprise larger coverage areas. In an embodiment, the utility function may be used such that a subframe configuration that balances these factors may be selected.

In an embodiment, the calculated utility function for a subframe configuration is directly proportional to the number of wireless devices serviced by the subframe configuration, directly proportional to the signal level metric for the plurality of wireless devices determined for the subframe configuration, and indirectly proportional to the historical average throughput metric for the plurality of wireless devices determined for the subframe configuration.

In an embodiment, one or more weights may be used in combination with the disclosed equation. For example, one or more of SL( ), A_TH( ), and C( ) may be multiplied by a weight in order to increase or decrease the weight of the result on the utility function. In an embodiment, network conditions may prioritize coverage, for instance if a large number of wireless devices enter an area, and therefore a weight on C( ) may be increased (e.g., the result of C( ) may be multiplied by 1.05-2.0). Weights on SL( ) and A_TH( ) may be similarly implemented.

At step 612, a subframe configuration from the plurality of subframe configurations with the greatest calculated utility function may then be selected. For example, based on the calculated utility function for each subframe configuration, the subframe configuration with the greatest utility function may be selected.

In an embodiment, the function SL( ) may comprise an average while the function A_TH( ) may comprise a sum. In this example, the weights on SL( ), A_TH( ) and C( ) may be 1. The signal levels (e.g., SINRs) of wireless device 202, 204, 206 and 208 may be 20 dB, 15 dB, 4 dB and 2 dB respectively. At a time T1, the network may be using the first subframe configuration with coverage area 212, and the historical average throughputs for wireless devices 202, 204, 206, and 208 may be 20 Mbps, 18 Mbps, 2 Mbps, and 1 Mbps respectively. In this example, the utility function U(1)=AVG(20,15)*(2/4)/SUM(20,18)=0.23, which is less than U(2)=AVG(20,15,4,2)*(4/4)/SUM(20,18,2,1)=0.25. Accordingly, the subframe configuration may be changed from the first subframe configuration with coverage area 212 to the second subframe configuration with the coverage area 214. At time T2, the historical average throughputs of the wireless device 202, 204, 206 and 208 are updated, and may be 10 Mbps, 8 Mbps, 5 Mbps, and 3 Mbps respectively. Based on the updates, at T2 The utility function U(1)=AVG(20,15)*(2/4)/SUM(10,8)=0.49, which is larger than U(2)=AVG(20,15,4,2)*(4/4)/SUM(10,8,5,3)=0.39. Accordingly, the subframe configuration may be changed back to the first subframe configuration with coverage area 212. In an embodiment, the signal levels for wireless devices 202, 204, 206, and 208 and the coverage for each subframe configuration may also be updated, and new utility function values may be calculated based on the updates.

At step 614, the first subframe configuration may be adjusted to the selected subframe configuration such that the access node and the plurality of wireless devices communicate using the selected subframe configuration. For example, access node 512 may switch from using the first subframe configuration for communication with wireless devices to using the selected subframe configuration for communication with wireless devices.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 8:
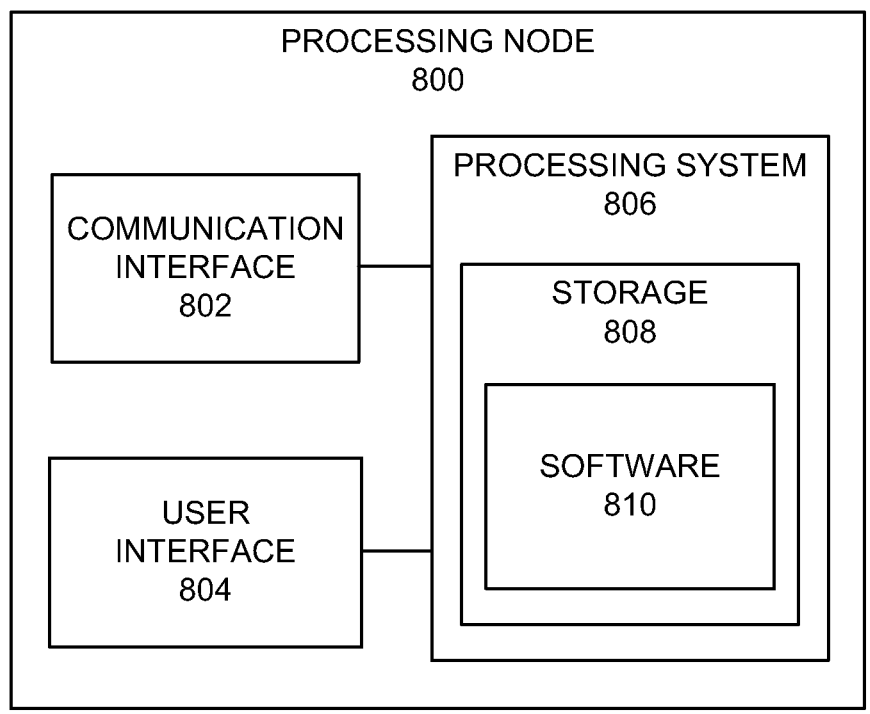
FIG. 8 illustrates an exemplary processing node.

FIG. 8 illustrates an exemplary processing node 800 in a communication system. Processing node 800 comprises communication interface 802, user interface 804, and processing system 806 in communication with communication interface 802 and user interface 804. Processing node 800 can be configured to determine a communication access node for a wireless device. Processing system 806 includes storage 808, which can comprise a disk drive, flash drive, memory circuitry, or other memory device. Storage 808 can store software 810 which is used in the operation of the processing node 800. Storage 808 may include a disk drive, flash drive, data storage circuitry, or some other memory apparatus. Software 810 may include computer programs, firmware, or some other form of machine-readable instructions, including an operating system, utilities, drivers, network interfaces, applications, or some other type of software. Processing system 806 may include a microprocessor and other circuitry to retrieve and execute software 810 from storage 808. Processing node 800 may further include other components such as a power management unit, a control interface unit, etc., which are omitted for clarity. Communication interface 802 permits processing node 800 to communicate with other network elements. User interface 804 permits the configuration and control of the operation of processing node 800.

Examples of processing node 800 include controller node 408 and gateway node 410. Processing node 800 can also be an adjunct or component of a network element, such as an element of access nodes 106 or 406 and the like. Processing node 800 can also be another network element in a communication system. Further, the functionality of processing node 800 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for determining a subframe configuration for an access node based on coverage, the method comprising:
   communicating data between an access node and a plurality of wireless devices using a first subframe configuration from among a plurality of subframe configurations available at the access node;
   calculating a utility function for each of the plurality of subframe configurations, wherein the utility function is based on a coverage for each subframe configuration, a number of wireless devices serviced by each subframe configuration, and a historical average throughput metric for the plurality of wireless devices;
   selecting a subframe configuration from the plurality of subframe configurations with the greatest calculated utility function; and
   adjusting the first subframe configuration to the selected subframe configuration such that the access node and the plurality of wireless devices communicate using the selected subframe configuration.

2. The method of claim 1, wherein the number of wireless devices serviced by a subframe configuration comprises a ratio of the number of wireless devices serviced by the particular subframe configuration to a number of wireless devices serviced by a subframe configuration from among the plurality of subframe configurations that services the greatest number of wireless devices.

3. The method of claim 1, wherein the utility function is based on a signal level metric for the plurality of wireless devices.

4. The method of claim 1, wherein the calculated utility function for a subframe configuration is directly proportional to the number of wireless devices serviced by the subframe configuration.

5. The method of claim 3, wherein the signal level metric for the plurality of wireless devices is determined for a subframe configuration based on an estimated average signal level for the plurality of wireless devices when communicating with the access node using the subframe configuration.

6. The method of claim 5, wherein the calculated utility function for a subframe configuration is directly proportional to the signal level metric for the plurality of wireless devices determined for the subframe configuration.

7. The method of claim 1, wherein the historical average throughput metric for the plurality of wireless devices is determined for a subframe configuration based on one of a summation or an average of the historical average throughput for the plurality of wireless devices.

8. The method of claim 1, wherein the calculated utility function for a subframe configuration is indirectly proportional to the historical average throughput metric for the plurality of wireless devices determined for the subframe configuration.

9. The method of claim 1, wherein the plurality of subframe configurations each comprise a unique mix of uplink and downlink subframes such that a coverage for each subframe configuration is different.

10. A system for determining a subframe configuration for an access node based on coverage, the system comprising:
    a processing node with a processor configured to:
       communicate data between an access node and a plurality of wireless devices using a first subframe configuration from among a plurality of subframe configurations available at the access node;
       calculate a utility function for each of the plurality of subframe configurations, wherein the utility function is based on a coverage for each subframe configuration, a number of wireless devices serviced by each subframe configuration, and a historical average throughput metric for the plurality of wireless devices;
       select a subframe configuration from the plurality of subframe configurations with the greatest calculated utility function; and
       adjust the first subframe configuration to the selected subframe configuration such that the access node and the plurality of wireless devices communicate using the selected subframe configuration.

11. The system of claim 10, wherein the number of wireless devices serviced by a subframe configuration comprises a ratio of the number of wireless devices serviced by the particular subframe configuration to a number of wireless devices serviced by a subframe configuration from among the plurality of subframe configurations that services the greatest number of wireless devices.

12. The system of claim 10, wherein the utility function is based on a signal level metric for the plurality of wireless devices.

13. The system of claim 10, wherein the calculated utility function for a subframe configuration is directly proportional to the number of wireless devices serviced by the subframe configuration.

14. The system of claim 12, wherein the signal level metric for the plurality of wireless devices is determined for a subframe configuration based on an estimated average signal level for the plurality of wireless devices when communicating with the access node using the subframe configuration.

15. The system of claim 14, wherein the calculated utility function for a subframe configuration is directly proportional to the signal level metric for the plurality of wireless devices determined for the subframe configuration.

16. The system of claim 12, wherein the historical average throughput metric for the plurality of wireless devices is determined for a subframe configuration based on one of a summation or an average of the historical average throughput for the plurality of wireless devices.

17. The system of claim 12, wherein the calculated utility function for a subframe configuration is indirectly proportional to the historical average throughput metric for the plurality of wireless devices determined for the subframe configuration.

18. The system of claim 10, wherein the plurality of subframe configurations each comprise a unique mix of uplink and downlink subframes such that a coverage for each subframe configuration is different.

* * * * *